United States Patent
Grajeda et al.

(10) Patent No.: US 10,774,941 B2
(45) Date of Patent: Sep. 15, 2020

(54) CONTROLLED BRAKE SOLENOID VALVE

(71) Applicant: BWI (Shanghai) Co., Ltd., Shanghai (CN)

(72) Inventors: Yinko I. Grajeda, Bellbrook, OH (US); Jose R. Cano, Centerville, OH (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 133 days.

(21) Appl. No.: 15/969,025

(22) Filed: May 2, 2018

(65) Prior Publication Data

US 2018/0363796 A1    Dec. 20, 2018

Related U.S. Application Data

(60) Provisional application No. 62/519,390, filed on Jun. 14, 2017.

(51) Int. Cl.
*F16K 31/02* (2006.01)
*B60T 8/36* (2006.01)
(Continued)

(52) U.S. Cl.
CPC .............. *F16K 31/02* (2013.01); *B60T 8/363* (2013.01); *F16K 1/54* (2013.01); *F16K 31/0655* (2013.01); *B60T 11/28* (2013.01)

(58) Field of Classification Search
CPC ........ F16K 1/54; F16K 31/02; F16K 31/0655; B60T 8/363; B60T 11/28
See application file for complete search history.

(56) References Cited

U.S. PATENT DOCUMENTS 6,332,655 B1 * 12/2001 Kamiya .................. B60T 8/363
                                                               303/113.1
6,846,408 B2    1/2005 Knight
(Continued)

FOREIGN PATENT DOCUMENTS

CN    101848830 A    9/2010
CN    102758948 A    10/2012
(Continued)

OTHER PUBLICATIONS

First Office Action and search report dated Mar. 21, 2019 for counterpart Chinese patent application No. 201810479686.5, along with machine EN translation downloaded from EPO.

*Primary Examiner* — Matthew W Jellett
(74) *Attorney, Agent, or Firm* — William H. Honaker; Dickinson Wright PLLC

(57) ABSTRACT

A controlled brake solenoid valve assembly includes a housing defining a channel. An actuating member including an armature and a plunger slidably disposed in the channel. A head portion extends outwardly from the plunger to a distal end. A drawn seat includes a narrowed portion disposed in the channel and defines a first compartment, a shoulder, and a hole. An elastic member disposed in the channel to bias the actuating member away from the drawn seat to define an opened position. The actuating member includes an actuator for moving the plunger from the opened position to a closed position. The distal end includes a restricting member, disposed in the hole, extending outwardly from the distal end, spaced from the terminal end, for providing annular fluid flow. A restricting block defines a restricting orifice having a variable diameter disposed in the first compartment to provide an orifice fluid flow.

18 Claims, 3 Drawing Sheets

(51) Int. Cl.
*F16K 1/54* (2006.01)
*F16K 31/06* (2006.01)
*B60T 11/28* (2006.01)

(56) References Cited

U.S. PATENT DOCUMENTS

| | | |
|---|---|---|
| 6,918,570 B2 | 7/2005 | Ahm |
| 6,988,707 B2 | 1/2006 | Ahn |
| 8,006,951 B2 | 8/2011 | Guggenmos et al. |
| 8,123,193 B2 * | 2/2012 | Kratzer .................. B60T 8/363 |
| | | 137/15.17 |
| 8,128,059 B2 | 3/2012 | Uechi et al. |
| 8,267,334 B2 | 9/2012 | Lee |
| 9,038,984 B2 * | 5/2015 | Voss ........................ B60T 8/363 |
| | | 251/30.04 |
| 9,090,236 B2 * | 7/2015 | Fricke-Schmidt .... B60T 8/3615 |
| 9,133,954 B2 | 9/2015 | Sato et al. |
| 9,163,746 B2 * | 10/2015 | Voss .................... F16K 31/0658 |
| 9,366,354 B2 | 6/2016 | Nanahara et al. |
| 2012/0273707 A1 | 11/2012 | Vier et al. |

FOREIGN PATENT DOCUMENTS

| | | |
|---|---|---|
| CN | 103629407 A | 3/2014 |
| DE | 10117610 A1 | 7/2002 |

* cited by examiner

CONTROLLED BRAKE SOLENOID VALVE

CROSS REFERENCE TO RELATED APPLICATION

This application claims the benefit of provisional application Ser. No. 62/519,390 filed on Jun. 14, 2017, the entire disclosure of which are incorporated herein by reference in its entirety.

BACKGROUND OF THE INVENTION

1. Field of the Invention

The present invention generally relates to a controlled brake solenoid valve assembly.

2. Description of the Prior Art

Controlled brake solenoid valves for controlling a fluid are known from the prior art in various embodiments. In particular, controlled brake solenoid valves are known as outlet valves for ABS/TSC/ESP devices in a motor vehicle. One such a controlled brake solenoid valve assembly is disclosed in U.S. Patent Application US2012/0273707. The controlled brake solenoid valve assembly includes housing disposed on a center axis and defining a channel extending along the center axis. An actuating member includes an armature and a plunger slidably disposed in the channel with the plunger extending between a first end adjacent to the armature and a second end. A head portion extends outwardly from the second end to a distal end. A drawn seat, including a narrowed portion defining a first compartment, is disposed in the channel and spaced from the housing. One end of the narrowed portion is disposed adjacent to the distal end and includes a protrusion defining a shoulder and a hole. An elastic member is disposed in the channel between the drawn seat and the actuating member to bias the head portion away from the shoulder to define an opened position allowing fluid to flow through the drawn seat. The actuating member further includes an actuator for moving the plunger from the opened position to a closed position with the distal end being in engagement with the shoulder to block the fluid from flowing through the drawn seat.

SUMMARY OF THE INVENTION

The present invention in its broadest aspect provides a controlled brake solenoid valve assembly having improved leak performance. The present invention also provides a simplified assembly process for the controlled brake solenoid valves. The present invention further provides for an annular flow of the fluid through the drawn seat.

It is one aspect of the present invention to provide a controlled brake solenoid valve assembly including a housing disposed on a center axis and defining a channel extending along the center axis. An actuating member includes an armature and a plunger slidably disposed in the channel with the plunger extending between a first end adjacent to the armature and a second end. A head portion extends outwardly from the second end to a distal end. A drawn seat, including a narrowed portion defining a first compartment, is disposed in the channel and spaced from the housing. One end of the narrowed portion is disposed adjacent to the distal end and includes a protrusion defining a shoulder and a hole. An elastic member is disposed in the channel between the drawn seat and the actuating member to bias the head portion away from the shoulder to define an opened position allowing fluid to flow through the drawn seat. The actuating member further includes an actuator for moving the plunger from the opened position to a closed position with the distal end being in engagement with the shoulder to block the fluid from flowing through the drawn seat. The distal end of the head portion includes a restricting member disposed in the hole and spaced from the terminal end of the protrusion for providing annular fluid flow through the drawn seat.

It is another aspect of the present invention to provide for a controlled brake solenoid valve assembly including housing disposed on a center axis and defining a channel extending along the center axis. An actuating member includes an armature and a plunger slidably disposed in the channel with the plunger extending between a first end adjacent to the armature and a second end. A head portion extends outwardly from the second end to a distal end. A drawn seat, including a narrowed portion defining a first compartment, is disposed in the channel and spaced from the housing. One end of the narrowed portion is disposed adjacent to the distal end and includes a protrusion defining a shoulder and a hole. An elastic member is disposed in the channel between the drawn seat and the actuating member to bias the head portion away from the shoulder to define an opened position allowing fluid to flow through the drawn seat. The actuating member further includes an actuator for moving the plunger from the opened position to a closed position with the distal end being in engagement with the shoulder to block the fluid from flowing through the drawn seat. A restricting block is disposed on the center axis, in the first compartment of the narrowed portion, and secured to the narrowed portion for limiting fluid flow through the hole of the drawn seat to provide an orifice fluid flow through the drawn seat.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
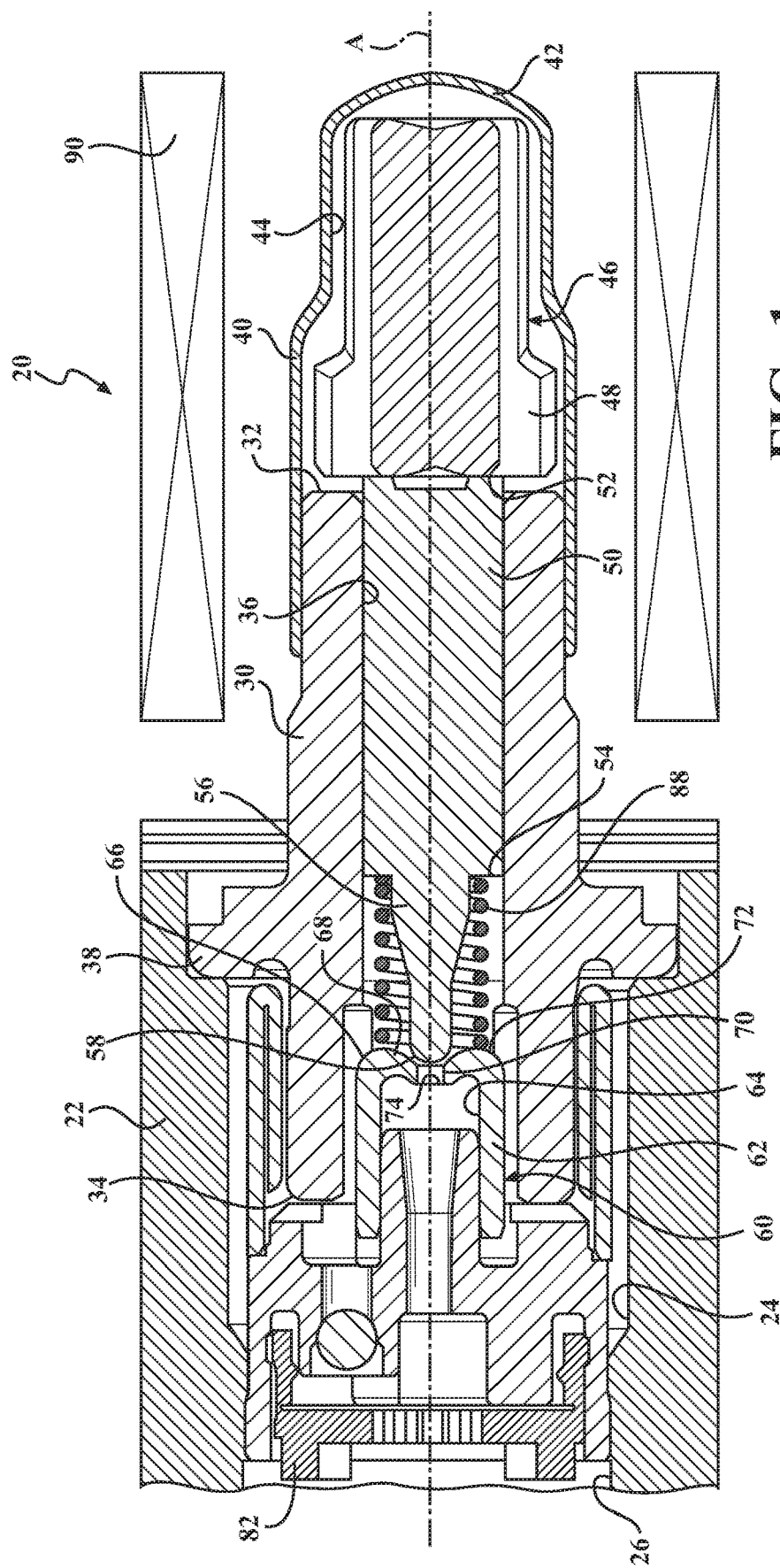
FIG. 1 is a cross-sectional perspective view of a controlled brake solenoid valve assembly.

Referring to the Figures, wherein like numerals indicate corresponding parts throughout the several views, a controlled brake solenoid valve assembly 20 is generally shown in FIG. 1. The controlled brake solenoid valve assembly 20 includes a modular block 22 having a cavity 24, an inlet 26, and an outlet 28 disposed in fluid communication with one another for allowing fluid to flow through the modular block 22.

The controlled brake solenoid valve assembly 20 includes a housing 30, having a generally tubular shape, disposed on a center axis A, extending between a first opened end 32 and a second opened end 34. The housing 30 defines a channel 36, having a generally cylindrical shape, extending along the center axis A between the first opened end 32 and the second opened end 34. The housing 30 includes a projection 38 disposed adjacent to and spaced from the second opened end 34. The projection 38 extends radially outwardly from the housing 30 for engaging the modular block 22 and securing the housing 30 to the modular block 22. A casing 40, having a generally cylindrical shape, is disposed on the center axis A, about the housing 30, and is secured to the housing 30 relative to the projection 38. It should be appreciated that the casing 40 may be secured to the housing 30 by methods such as, but not limited to, crimping and/or welding. The casing 40 extends outwardly from the housing 30 along the center axis A to a closed end 42, spaced from the first opened end 32, and defining a chamber 44 disposed in communication with the channel 36 between the first opened end 32 of the housing 30 and the closed end 42 of the casing 40.

An actuating member 46 including an armature 48 and a plunger 50 is slidably disposed in the channel 36. The armature 48, having a generally T-shaped cross-section, is disposed in the channel 36 and adjacent to the first opened end 32 of the housing 30. It should be appreciated that the armature 48 can also be disposed in the chamber 44 of the casing 40 as shown in FIG. 1. The plunger 50, having a generally cylindrical shape, is disposed in the channel 36 of the housing 30, slidable along the center axis A, and extends between a first end 52 and a second end 54. The first end 52 of the plunger 50 is disposed in abutment relationship with the armature 48. It should be appreciated that the armature 48 and the plunger 50 may be formed into one single component or two separate components. The second end 54 of the plunger 50 includes a head portion 56 extending outwardly and tapering from the second end 54 of the plunger 50 along the center axis A to a distal end 58 disposed in the channel 36 and spaced from the second opened end 34 of the housing 30.

A drawn seat 60 is disposed adjacent to the inlet 26 of the modular block 22 and attached to the modular block 22. The drawn seat 60 is also disposed in fluid communication with the channel 36 for allowing fluid flow from the inlet 26 to the channel 36. The drawn seat 60 includes a narrowed portion 62, having a generally cylindrical shape, disposed in the channel 36, on the center axis A, and defines a first compartment 64 extending along the center axis A. The narrowed portion 62 is spaced from the housing 30 with one end 66 of the narrowed portion 62 being disposed adjacent to the distal end 58 of the head portion 56. The one end 66 of the narrowed portion 62 includes a protrusion 68 extending outwardly from the one end 66 of the narrowed portion 62 and annularly about the center axis A, in an arcuate shape, toward the center axis A to a terminal end 70 spaced from the center axis A to define a shoulder 72 and a hole 74. The shoulder 72 is for receiving the distal end 58 of the head portion 56. The hole 74, having a generally circular shape, is disposed on the center axis A for allowing fluid to flow through the drawn seat 60 to the channel 36. As shown in FIG. 2A, the drawn seat 60 further includes an extended portion 76 disposed on the center axis A and flaring outwardly from the narrowed portion 62 of the housing 30 to an extended end 78 defining a second compartment 80 disposed in fluid communication with the first compartment 64 for allowing the fluid to flow from the inlet 26, through the drawn seat 60, to the channel 36.

A first filter 82, having a circular shape and made of a mesh material, is secured to the extended end 78 of the extended portion 76 for removing impurities and foreign material from the fluid. A seal 84, made from an elastomeric material, is disposed adjacent to the first filter 82, annularly about the extended portion 76, and spaced from the second opened end 34 of the housing 30 for securing the drawn seat 60 to the modular block 22. A second filter 86, made of mesh material, is disposed adjacent to the seal 84 and sandwiched between the seal 84 and the second opened end 34 of the housing 30 for further removing impurities and the foreign material from the fluid.

An elastic member 88 is disposed in the channel 36 relative to the second opened end 34 of the housing 30. The elastic member 88 extends between the drawn seat 60 and the actuating member 46 to bias the distal end 58 of the head portion 56 and the armature 48 away from the hole 74 to define an opened position providing fluid communication between the inlet 26, the first compartment 64, the second compartment 80, the hole 74, the channel 36, and the outlet 28 allowing the fluid to flow through the drawn seat 60. The elastic member 88 is a spring 88 extending helically about the head portion 56 between the narrowed portion 62 of the drawn seat 60 and the second end 54 of the plunger 50. The actuating member 46 includes an actuator 90 for moving the plunger 50 linearly along the center axis A from the opened position to a closed position. The closed position is defined as the distal end 58 of the head portion 56 being in abutment relationship with the shoulder 72 of the protrusion 68, compressing the spring 88, blocking the fluid from flowing through the drawn seat 60. It should be appreciated that the armature 48 can have a magnet body and the actuator 90 can be a magnetic coil disposed annularly about the casing 40 for creating a magnetic force to move the armature 48 and the plunger 50 from the opened position to the closed position to block the fluid from flowing through the drawn seat 60. Alternatively, the actuator 90 can also be a plurality of electromagnets disposed between the first end 52 of the plunger 50 and the armature 48 wherein, in response to an electric signal, the electromagnets energizes and moves the plunger 50 from the open position to the closed position. In the event that no electric signal is provided to the electromagnets, the plunger 50 remains in the opened position to allow fluid flow through the drawn seat 60 and the channel 36.

Figure 2B:
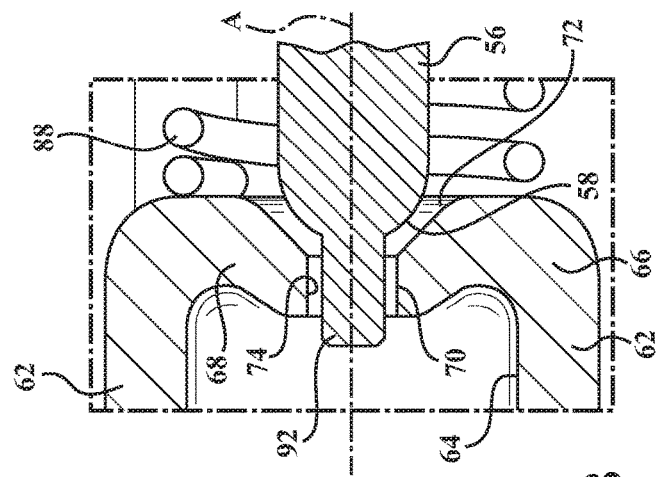
FIG. 2B is an enlarged cross-sectional view of the controlled brake solenoid valve assembly shown in 2A.
Figure 2A:
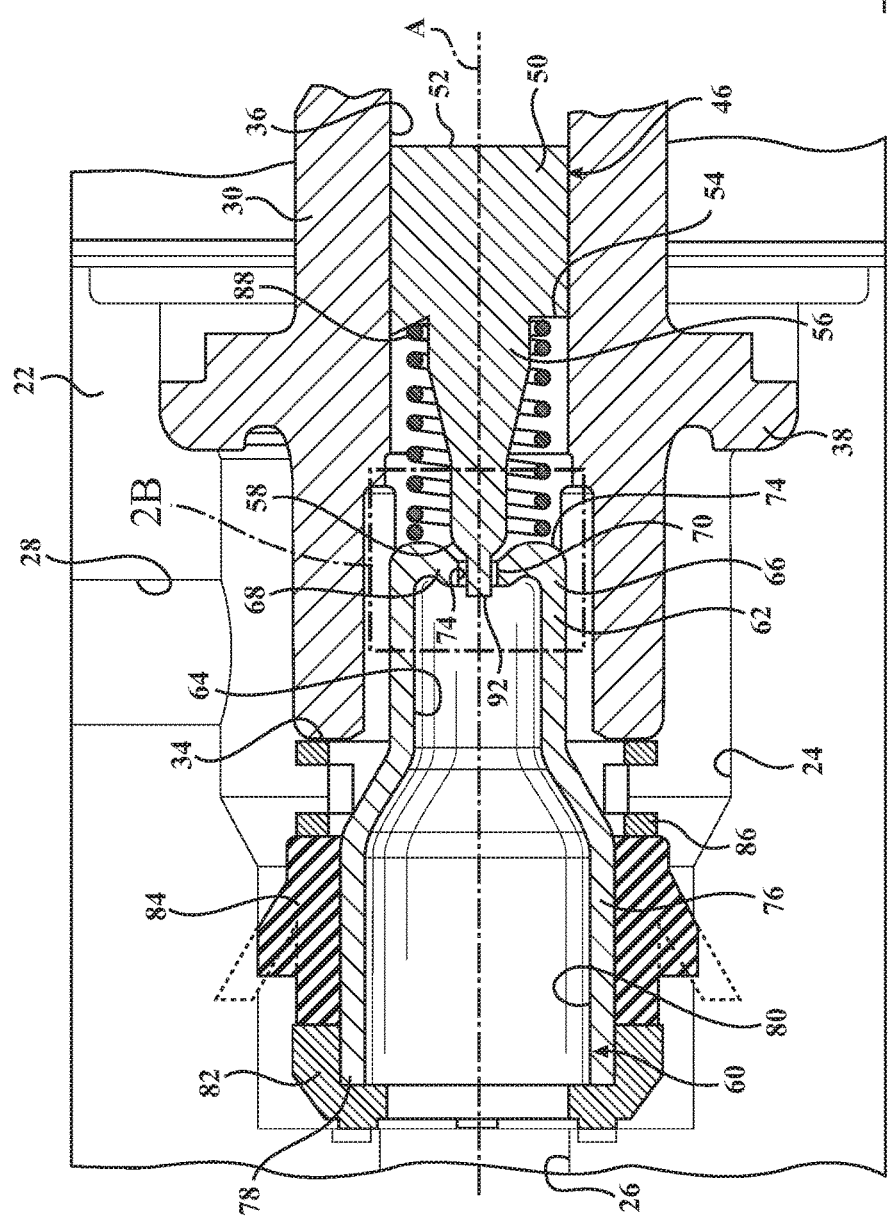
FIG. 2A is a fragmentary cross-sectional view of the controlled brake solenoid valve assembly.

As shown in FIGS. 2A and 2B, the distal end 58 of the head portion 56 includes a restricting member 92, disposed on the center axis A, and extends outwardly from the distal end 58 of the head portion 56, in the hole 74 and spaced from the terminal end 70 of the protrusion 68, for providing annular fluid flow through the drawn seat 60. The restricting member 92 includes a nub 92 disposed on the center axis A and extends outwardly from the distal end 58 of the head portion 56 into the hole 74, spaced from the terminal end 70 of the protrusion 68. As best illustrated in FIGS. 2A and 2B, the restricting member 92 is always disposed in the hole 74 of the drawn seat 60 regardless of whether the plunger 50 is in the opened position or the closed position to provide the annular flow of the fluid through the drawn seat 60.

Figures 3A, 3B:
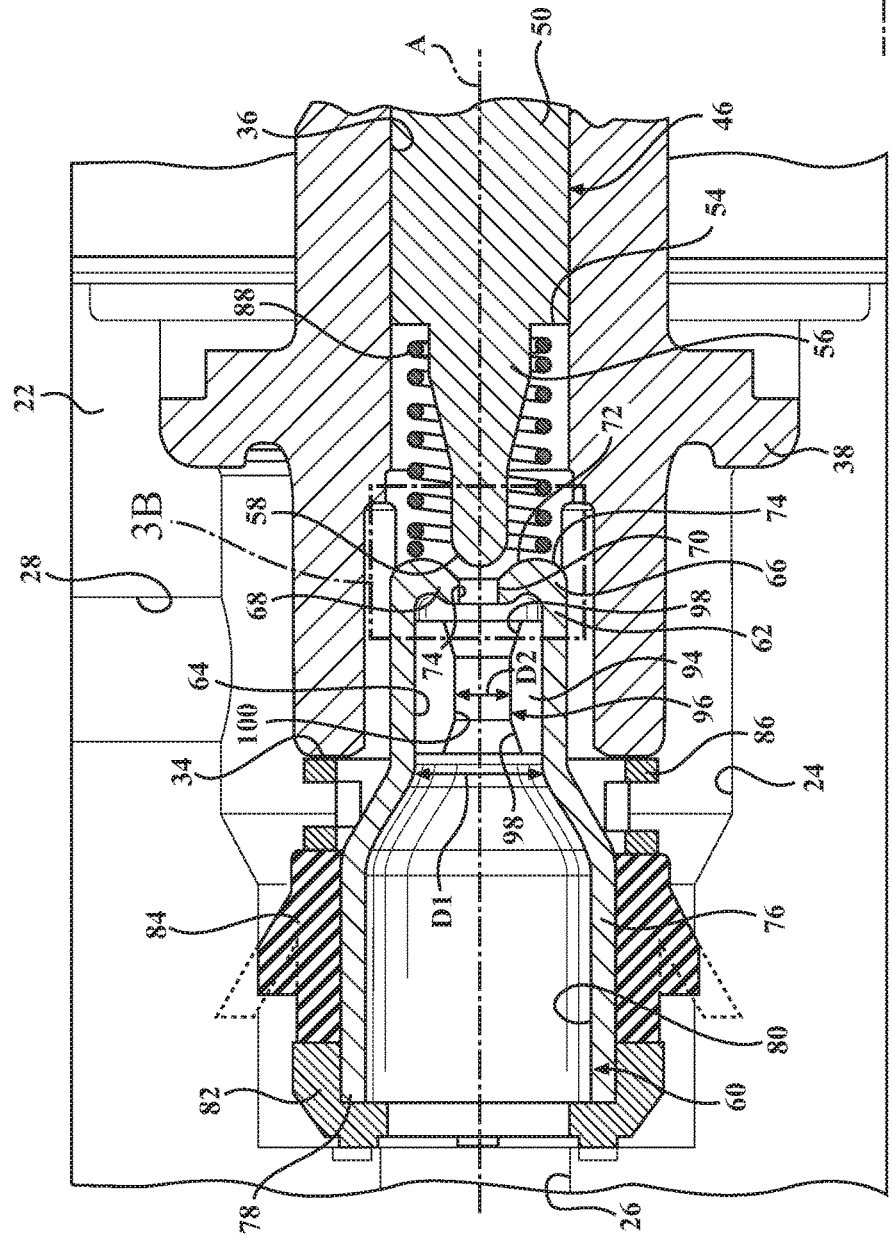
FIG. 3A is a fragmentary cross-section view of an alternative embodiment of the controlled brake solenoid valve assembly.
FIG. 3B is an enlarged cross-sectional view of the controlled brake solenoid valve assembly shown in 3A.

As shown in FIGS. 3A and 3B, a restricting block 94 is disposed on the center axis A in the first compartment 64 of the narrowed portion 62 and secured to the narrowed portion 62 for limiting fluid flow through the hole 74 of the drawn seat 60 to provide a more consistent fluid flow definition, e.g. an orifice fluid flow, through the drawn seat 60. The restricting block 94 defines a restricting orifice 96 having a variable diameter extending though the restricting block 94 for limiting the fluid flow through the drawn seat 60. The restricting orifice 96 includes a pair of first orifice portions 98, each having a generally circular shape, and defining a first predetermined diameter $D_1$ disposed on opposing surfaces of the restricting block 94. The first orifice portions 98 tapering towards the center axis A to a second orifice portion 100 defining a second predetermined diameter $D_2$ with the second predetermined diameter $D_2$ being less than the first predetermined diameter $D_1$.

In operation, the head portion 56 of the plunger 50 in the channel 36 is constantly in the opened position biased by the elastic member 88. A fluid, e.g. a brake fluid, from a master cylinder is fed through the first filter 82 to remove foreign particles from the brake fluid and into the first compartment 64 and the second compartment 80 of the drawn seat 60. With the head portion 56 of the plunger 50 being in the opened position, the nub 92 of the restricting member 92 is disposed in the hole 74, spaced from the terminal ends 70 of the protrusion 68, for providing the annular fluid flow through the drawn seat 60 thereby allowing the brake fluid to flow from the inlet 26, through the first compartment 64 and the second compartment 80, through the hole 74 and the channel 36, to the outlet 28.

When the regulation of the fluid flow is necessary, the actuator 90 will move the head portion 56 of the plunger 50 from the opened position to the closed position to cut off the brake fluid from flowing through the hole 74, the channel 36, and the outlet 28. In other words, when it is necessary to regulate the fluid flow, the actuator 90 will move the head portion 56 of the plunger 50 towards the drawn seat 60 until the distal end 58 of the head portion 56 is in engagement with the shoulder 72 of the narrowed portion 62 of the drawn seat 60 thereby blocking the brake fluid from flowing through the drawn seat 60.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A controlled brake solenoid valve assembly comprising,
    a housing disposed on a center axis and defining a channel extending along said center axis;
    an actuating member including an armature and a plunger slidably disposed in said channel with said plunger extending between a first end adjacent to said armature and a second end;
    a head portion extending outwardly from said second end to a distal end;
    a drawn seat including a narrowed portion defining a first compartment disposed in said channel and spaced from said housing with one end of said narrowed portion disposed adjacent to said distal end and including a protrusion defining a shoulder and a hole, said hole having a substantially constant diameter along said center axis and said shoulder being adapted to receive said distal end of said head portion;
    an elastic member disposed in said channel between said drawn seat and said actuating member to bias said head portion away from said drawn seat to define an opened position to allow fluid to flow through said drawn seat;
    said actuating member further including an actuator for moving said plunger from said opened position to a closed position with said closed position being defined as said distal end being disposed in abutment relationship with said shoulder to block the fluid from flowing through said drawn seat; and
    said distal end of said head portion including a restricting member disposed in said hole and spaced from a terminal end of said protrusion for providing annular fluid flow through said drawn seat in said opened position;
    wherein said restricting member is a nub disposed on said center axis and extends outwardly from said distal end of said head portion and into said hole and radially spaced from said protrusion whereby in said opened position, said distal end of said head portion is axially spaced from said drawn seat and said restricting member being located in said hole and radially spaced from an inner surface of said hole.

2. The controlled brake solenoid valve assembly as set forth in claim 1 further including a restricting block disposed on said center axis in said first compartment of said narrowed portion and secured to said narrowed portion for limiting fluid flow through said hole of said drawn seat to provide an orifice fluid flow through said drawn seat.

3. The controlled brake solenoid valve assembly as set forth in claim 2 wherein said restricting block defines a restricting orifice having a variable diameter extending though said restricting block for restricting the fluid flow through said drawn seat.

4. The controlled brake solenoid valve assembly as set forth in claim 3 wherein said restricting orifice includes a pair of first orifice portions of circular shape and defining a first predetermined diameter disposed at opposing surfaces of said restricting block with said first orifice portion tapering towards one another along said center axis to a second orifice portion defining a second predetermined diameter with said second predetermined diameter being less than said first predetermined diameter.

5. The controlled brake solenoid valve assembly as set forth in claim 1 wherein said drawn seat further includes an extended portion disposed on said center axis and flaring outwardly from said narrowed portion of said housing to an extended end defining a second compartment disposed in fluid communication with said first compartment.

6. The controlled brake solenoid valve assembly as set forth in claim 5 further including a first filter made of a mesh material secured to said extended end of said extended portion for removing impurities from the fluid.

7. The controlled brake solenoid valve assembly as set forth in claim 6 further including a seal disposed adjacent to said first filter and annularly about said extended portion spaced from a second opened end of said housing for securing said drawn seat to a modular block.

8. The controlled brake solenoid valve assembly as set forth in claim 7 further including a second filter made of mesh material disposed adjacent to said seal and sandwiched between said seal and said second opened end of said housing for removing impurities from the fluid.

9. The controlled brake solenoid valve assembly as set forth in claim 1 wherein said protrusion extends from said one end and toward said center axis and annularly about said center axis to a terminal end spaced from said center axis to define said shoulder and said hole.

10. The controlled brake solenoid valve assembly as set forth in claim 1 wherein said elastic member is a spring extending helically about said head portion between said narrowed portion of said drawn seat and said second end of said plunger.

11. A controlled brake solenoid valve assembly comprising,
- a housing disposed on a center axis and defining a channel extending along said center axis;
- an actuating member including an armature and a plunger slidably disposed in said channel with said plunger extending between a first end adjacent to said armature and a second end;
- a head portion extending outwardly from said second end to a distal end;
- a drawn seat including a narrowed portion defining a first compartment disposed in said channel and spaced from said housing with one end of said narrowed portion disposed adjacent to said distal end and including a protrusion defining a shoulder and a hole, said hole having a substantially constant diameter along said center axis;
- an elastic member disposed in said channel between said drawn seat and said second end to bias said head portion away from said drawn seat to define an opened position allowing fluid to flow through said drawn seat;
- said actuating member further including an actuator for moving said plunger from said opened position to a closed position with said closed position being defined as said distal end being in an abutment relationship with said shoulder to block the fluid from flowing through said drawn seat; and
- a restricting block disposed on said center axis, axially spaced apart from said shoulder and said hole and confined in said first compartment of said narrowed portion, secured to said narrowed portion for limiting fluid flow through said hole of said drawn seat to provide an orifice fluid flow through said drawn seat in said opened position;
- wherein said restricting block and said hole are axially spaced apart from one another, said restricting block defines a restricting orifice having a variable diameter extending though said restricting block for restricting the fluid flow through said drawn seat.

12. The controlled brake solenoid valve assembly as set forth in claim 11 wherein said restricting orifice includes a pair of first orifice portions of circular shape and defining a first predetermined diameter disposed at opposing surfaces of said restricting block with said first orifice portion tapering towards one another along said center axis to a second orifice portion defining a second predetermined diameter with said second predetermined diameter being less than said first predetermined diameter.

13. The controlled brake solenoid valve assembly as set forth in claim 11 wherein said distal end of said head portion includes a restricting member disposed in said hole and spaced from a terminal end of said protrusion for providing annular fluid flow through said drawn seat in said opened position.

14. The controlled brake solenoid valve assembly as set forth in claim 11 wherein said distal end of said head portion includes a restricting member disposed in said hole and spaced from a terminal end of said protrusion for providing annular fluid flow through said drawn seat.

15. The controlled brake solenoid valve assembly as set forth in claim 14 wherein said restricting member is a nub disposed on said center axis and extends outwardly from said distal end of said head portion and into said hole and spaced from said protrusion.

16. The controlled brake solenoid valve assembly as set forth in claim 11 wherein said protrusion extends from said one end and toward said center axis and annularly about said center axis to a terminal end spaced from said center axis to define said shoulder and said hole.

17. The controlled brake solenoid valve assembly as set forth in claim 11 wherein said elastic member is a spring extending helically about said head portion between said narrowed portion of said drawn seat and said second end of said plunger.

18. The controlled brake solenoid valve assembly as set forth in claim 2 wherein said restricting block and said hole are axially spaced from each other.

* * * * *